US009852772B2

United States Patent
Weber (10) Patent No.: US 9,852,772 B2
(45) Date of Patent: Dec. 26, 2017

(54) DEVICE AND METHOD FOR PLAYING AN INTERACTIVE AUDIOVISUAL MOVIE

(71) Applicant: CtrlMovie AG, Altishofen (CH)

(72) Inventor: Tobias Weber, Winterhur (CH)

(73) Assignee: CTRLMOVIE AG, Altishofen (CH)

( * ) Notice: Subject to any disclaimer, the term of this patent is extended or adjusted under 35 U.S.C. 154(b) by 0 days.

(21) Appl. No.: 15/121,019

(22) PCT Filed: Feb. 9, 2015

(86) PCT No.: PCT/EP2015/000266
§ 371 (c)(1),
(2) Date: Aug. 23, 2016

(87) PCT Pub. No.: WO2015/124269
PCT Pub. Date: Aug. 27, 2015

(65) Prior Publication Data
US 2017/0069351 A1 Mar. 9, 2017

(30) Foreign Application Priority Data
Feb. 24, 2014 (CH) ........................... 0288/14

(51) Int. Cl.
*H04N 5/92* (2006.01)
*G11B 27/10* (2006.01)
(Continued)

(52) U.S. Cl.
CPC .......... *G11B 27/105* (2013.01); *G11B 27/322* (2013.01); *G11B 27/329* (2013.01);
(Continued)

(58) Field of Classification Search
CPC ... G11B 27/105; G11B 27/322; G11B 27/329; H04N 5/7605; H04N 5/84; H04N 5/91
(Continued)

(56) References Cited

U.S. PATENT DOCUMENTS 7,222,354 B1 * 5/2007 Ching ................. H04N 5/4401
348/E5.006
2004/0105349 A1 6/2004 Seo et al.
(Continued)

FOREIGN PATENT DOCUMENTS

EP 1768404 A1 3/2007
EP 1873780 A1 1/2008
(Continued)

OTHER PUBLICATIONS

International Search Report for International Application No. PCT/EP2015/000266, dated May 21, 2015.

*Primary Examiner* — Robert Chevalier
(74) *Attorney, Agent, or Firm* — Knobbe, Martens, Olson & Bear LLP (57) ABSTRACT

For playing an interactive audiovisual movie, a movie episode data object which comprises a plurality of audio/video segments, separate audio tracks, and playback instructions is stored (51) in a data store of a computerized playback device. The playback device retrieves (52) the playback instructions and, in accordance with the playback instructions, retrieves (S31) and plays (532) audio/video segments, generates (535) interface elements for receiving from a user decision commands while playing the audio/video segments, and retrieves (S31) and plays (S32) further audio/video segments depending on the user decision commands. The playback device further retrieves (S33) one of the separate audio tracks and plays (S34) the separate audio track uninterruptedly while playing an end of a first audio/video segment and a start of a second audio/video segment which is played subsequently to the first audio/video segment. Thus, an audio track is played uninterruptedly across the boundary of two consecutive audio/video segments.

14 Claims, 7 Drawing Sheets

(51) Int. Cl.
    *G11B 27/32*     (2006.01)
    *H04N 5/76*     (2006.01)
    *H04N 5/84*     (2006.01)
    *H04N 5/91*     (2006.01)

(52) U.S. Cl.
    CPC ............ *H04N 5/7605* (2013.01); *H04N 5/84* (2013.01); *H04N 5/91* (2013.01)

(58) Field of Classification Search
    USPC ................ 386/241, 248, 337, 338, 339, 340
    See application file for complete search history.

(56) References Cited

U.S. PATENT DOCUMENTS

2011/0200116 A1    8/2011    Bloch et al.
2011/0202562 A1    8/2011    Bloch et al.

FOREIGN PATENT DOCUMENTS

WO    WO 2007/046248 A1    4/2007
WO    WO 2013/011895 A1    1/2013

\* cited by examiner

DEVICE AND METHOD FOR PLAYING AN INTERACTIVE AUDIOVISUAL MOVIE

FIELD OF THE INVENTION

The present invention relates to a device and a method for playing an interactive audiovisual movie. Specifically, the present invention relates to a computerized device and a method using a computerized playback device for playing an interactive audiovisual movie.

BACKGROUND OF THE INVENTION

Before wideband and high data throughput Internet was available on a widespread basis to private households, audiovisual movies were distributed on and reproduced from optical discs, such as DVD (Digital Versatile Disc) or BD discs (Blu-ray Disc). While optical discs made it possible to store the data of an entire movie on one or more discs, depending on the length of the movie, dynamic changes from one segment of the movie to a selected non-consecutive segment were inherently slow and caused noticeable interruptions for a user, because the dynamic change required that a reader head be moved physically to the location on the optical disc where the selected segment was stored. Thus, optical disks are not suitable for playing interactive audiovisual movies.

EP 1 873 780 describes a technique for realizing a slide show with the use of MPEG2 stored on an optical disc. Specifically, EP 1 873 780 describes a technique for managing audio visual streams in connection with still images recorded on a recording medium by using a clip layer that manages one or more still images, and a playlist layer that has a plurality of play items representing playback sections of the slide show using the still images contained in the clip. EP 1 873 780 further describes playing audio in synchronization with the slide show whereby the playback start time of each still image is predetermined using an entry point map for audio that includes the start time in each audio stream and information indicating the address of a source packet corresponding to the start time and the end time.

EP 1 768 404 describes another slideshow playback function where a plurality of picture data pieces recorded on an optical disc are decoded one by one for viewing by a user. According to EP 1 768 404, an optical disc has recorded thereon a slideshow application which includes a video stream, an audio stream and playlist information. The video stream has browsing units with picture data. The playlist information indicates a still period, when the display of the picture data is to be frozen, which is equal to or exceeds the time length for reading a subsequent browsing unit to a decoder buffer.

In the context of video images recorded on DVD or BD discs, WO 2013/011895 and US 2014/0161419 disclose a program that performs loop playback of the images while continuing to output a sound stream that is out of synchronization with the images. Loop playback of images may be suitable for slideshows where the reader head can be moved to and read a new segment, while the previous image is continuously being presented to the user; however, this approach does not overcome the problem of noticeable interruptions that would be caused by movements of the reader head, in response to user-selected dynamic alterations of the flow of video segments, as required for playing interactive audiovisual movies.

WO 2007/046248 describes an information playback system that uses an information storage system such as an optical disc, e.g. a DVD. According to WO 2007/046248, the reproduction and display of presentation objects, specifically Enhanced Video-Objects (EVOB), is managed by a playlist stored on the optical disc.

US 2004/105349 describes a method and an apparatus for reproducing a data stream which has multiple reproduction paths recorded on a high-density optical disc, to enable a seamless reproduction of video and audio data even when the reproduction path is changed during reproduction.

With the increased availability of wideband and high data throughput Internet as well as the improved media capabilities of personal computing devices, it has become possible to use the computing power and user interface capabilities inherently available in these devices for processing and controlling interactive audiovisual movies where different story lines are played depending on user decisions.

US 2007/0099684 describes a system for implementing interactive storylines where viewers are allowed to interact with a story in a video or film environment. According to US 2007/0099684 the system inserts menu prompts or branch points throughout the storyline to enable the viewers to create different stories from the same situations and displays alternative video content depending on the viewer selection.

US 2013/0239132 describes an apparatus for enabling interactive dynamic movies. According to US 2013/0239132 alternative movie segments having exactly the same number of frames and equal runtime are stored for alternative scenes of a movie. A message is sent to viewers asking for their votes on which of the alternative movie segments should be played. Depending on the majority vote, one of the alternative movie segments is selected and played.

US 2006/0064733 describes an apparatus for playing an audiovisual work that supports dynamic choosing of story branches and outcomes. According to US 2006/0064733 decision selection icons are displayed during the playing of a segment of the audiovisual work. Depending on user input representing a selection of one of the icons, another segment of the audiovisual work is selected and played. Unless the user explicitly indicates a desire to interrupt the story and move onto the next segment, the segment continues to be played until its end is reached and the next segment is retrieved and played.

US 2011/202562 describes a system and a method for data mining in the context of an interactive video. During the presentation of an interactive video, a user may interact with the interactive video, e.g. by making selections, choosing options, etc. related to one or more aspects of the interactive video. Such events are recorded, stored, and analyzed in the context of one or more campaigns associated with the interactive video, such as marketing campaigns, advertising campaigns, interactive examinations, etc.

US 2011/200116 describes the seamless assembly of video/audio segments during the online streaming and progressive downloading of media, whereby a second segment is downloaded via a network, such as the Internet, to a client during the presentation of a first segment. The first segment is then attached to the beginning of the second segment, where no jitter or gap results with the transition point either in the video or audio portion of the segments. A gapless media file is created for encoding the video and audio segments using a gapless audio encoding scheme where synchronized, gapless audio tags are interleaved in the video segments. According to US 2011/200116, a user may alter the course or flow of segments after the completion of a segment. Thus, a user's command to alter the flow of segments does not affect the presentation flow, until the presentation of the current segment is completed, requiring the user to wait for the end of the current segment, until the user command takes effect.

The prior art solutions provide for interactive selection of audiovisual segments to create dynamically different storylines. However, unless the viewer is willing to interrupt the playing of segments and the narrative flow of the story, the storyline is presented in a sequence of uninterrupted segments with predefined and unalterable length.

SUMMARY OF THE INVENTION

It is an object of this invention to provide a device and a method for playing an interactive audiovisual movie, which device and method do not have at least some of the disadvantages of the prior art. In particular, it is an object of the present invention to provide a device and a method for playing an interactive audiovisual movie which device and method make it possible to play segments of dynamically variable length, without interrupting the media playback and, thus, the narrative flow of the story.

According to the present invention, these objects are achieved through the features of the independent claims. In addition, further advantageous embodiments follow from the dependent claims and the description.

According to the present invention, the above-mentioned objects are particularly achieved in that a computerized device for playing an interactive audiovisual movie comprises a playback engine and a movie episode data object. The movie episode data object comprises a plurality of audio/video segments and playback instructions. The playback instructions are configured to direct the playback engine to retrieve and play from the movie episode data object audio/video segments, to receive from a user decision commands while playing the audio/video segments, and to retrieve and play from the movie episode data object further audio/video segments depending on the user decision commands. The movie episode data object further comprises audio tracks which are separate from the audio/video segments and have no video content, and further playback instructions configured to direct the playback engine to retrieve from the movie episode data object one of the separate audio tracks and to play the separate audio track uninterruptedly during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment. The provision of separate audio tracks makes it possible to play to the user an uninterrupted, continuous stream of media content, even during the change of audio/video segments at varying points in time, selected interactively and dynamically by the user during playback of the audiovisual movie. Thus, responsive to user decision commands, it is possible to change from a first audio/video segment to a user selected second audio/video segment, at a point in time before the end of the first audio/video segment, thereby interrupting the playing of the first audio/video segment and commencing playing of the subsequent second audio/video segment, while continuing the uninterrupted playing of the separate audio track during the transition from the first audio/video segment to the user selected second audio/video segment. This provides to the user an uninterrupted, continuous audio stream during the changeover from a first audio/video segment, interrupted by a user decision command, to a subsequent second audio/video segment, selected by the user decision command. Unlike in prior art systems, where a continuous audio track is played during the rendering of a pre-defined series of muted video segments or where a user selected audio/video segment is played after completing the playing of an entire preceding audio/video segment, from its start to its very end, the playback engine and the movie episode data object described above make it possible for a user not only to decide dynamically and interactively the point in time when the playing is to change from a first audio/video segment to a second audio/video segment, but also to select that second audio/video segment, and to perform the change, from the first audio/video segment to the user selected second audio/video segment, at a user selected point in time, before the first audio/video segment is played to its end, and while the separate audio track is being played uninterruptedly.

In an embodiment, the separate audio tracks include cue points, a cue point indicating a position in an audio track where, during playing of that audio track, the audio track is suitable for editing. The movie episode data object further comprises playback instructions configured to direct the playback engine to stop playing a separate audio track at a cue point and to start playing a different separate audio track at that cue point. Cue points indicating editable points in an audio track make it possible to edit dynamically the audio track for a continuous and seamless soundtrack; thereby, enabling the dynamic change of audio tracks for altering the mood and/or the length of background music, for example, in response and corresponding to user decision commands received from the user during playback of the audiovisual movie.

In a further embodiment, the movie episode data object further comprises playback instructions configured to direct the playback engine to select a cue point for changing the audio track depending on the user decision commands.

In another embodiment, the movie episode data object further comprises playback instructions configured to direct the playback engine to select the different audio track depending on the user decision commands.

In yet another embodiment, the movie episode data object further comprises playback instructions configured to direct the playback engine, depending on the user decision commands, to end playing a separate audio track by stopping the audio track at a defined time code of the audio/video segment being played, stopping the audio track at a beat of the audio track, stopping the audio track at once, fading out the audio track by starting fade out at a defined time code of the audio/video segment being played, fading out the audio track by starting fade out at once, replacing the audio track with a suitable audio end track, and/or cross fading the audio track with a different audio track. Thus, it is possible to alter and adapt dynamically the ending of an audio track during playback of the audiovisual movie, e.g. in response and corresponding to user decision commands received from the user during playback of the audiovisual movie.

In an embodiment, the movie episode data object further comprises playback instructions configured to direct the playback engine, depending on the user decision commands, to stop playing the audio/video segment at a defined time code of the audio/video segment being played, and to start playing a different audio/video segment at that time code.

In a further embodiment, the playback engine is configured to generate an audio master track by mixing and mastering the audio part of the audio/video segment and one or more separate audio tracks that are played concurrently with the audio/video segment.

In an embodiment, the computerized device further comprises an interaction server configured to receive user decision commands from a plurality of communication terminals, and to determine from the user decision commands a popular user decision command. The playback engine is configured to perform the following steps, depending on the popular user decision command: retrieving and playing audio/video segments, selecting an audio track, selecting a cue point for changing an audio track, ending an audio track, stopping an audio/video segment at a defined time code of the audio/video segment being played, and/or starting a different audio/video segment at that time code.

In addition to a computerized device for playing an interactive audiovisual movie, the present invention also relates to a method of playing an interactive audiovisual movie. The method comprises storing in a data store of a computerized playback device a movie episode data object which comprises a plurality of audio/video segments, audio tracks which are separate from the audio/video segments and have no video content, and playback instructions. The method further comprises the playback device retrieving the playback instructions from the movie episode data object, and in accordance with the playback instructions the playback device retrieving and playing from the movie episode data object audio/video segments, generating interface elements for receiving from a user decision commands while playing the audio/video segments, retrieving and playing from the movie episode data object further audio/video segments depending on the user decision commands, retrieving from the movie episode data object one of the separate audio tracks, and playing the separate audio track uninterruptedly, during a change of audio/video segments occurring at a point in time selected interactively and dynamically by the user, while playing an end of a first audio/video segment, up to the point in time selected by the user, and a start of a second audio/video segment which is selected by the user and played subsequently to the first audio/video segment.

In an embodiment, the movie episode data object is stored in the data store with separate audio tracks which include cue points, a cue point indicating a position in an audio track where, during playing of that audio track, the audio track is suitable for editing. The method further comprises the playback device, in accordance with the playback instructions, stopping to play a separate audio track at a cue point and starting to play a different separate audio track at that cue point.

In another embodiment, the method further comprises the playback device, in accordance with the playback instructions, selecting a cue point for changing the audio track depending on the user decision commands.

In an embodiment, the method further comprises the playback device, in accordance with the playback instructions, selecting the different audio track depending on the user decision commands.

In yet another embodiment, the method further comprises the playback device, in accordance with the playback instructions and depending on the user decision commands, ending to play a separate audio track by stopping the audio track at a defined time code of the audio/video segment being played, stopping the audio track at a beat of the audio track, stopping the audio track at once, fading out the audio track by starting fade out at a defined time code of the audio/video segment being played, fading out the audio track by starting fade out at once, replacing the audio track with a suitable audio end track, and/or cross fading the audio track with a different audio track.

In an embodiment, the method further comprises the playback device, in accordance with the playback instructions and depending on the user decision commands, stopping to play the audio/video segment at a defined time code of the audio/video segment being played, and starting to play a different audio/video segment at that time code.

In another embodiment, the method further comprises the playback device generating an audio master track by mixing and mastering the audio part of the audio/video segment and one or more separate audio tracks that are played concurrently with the audio/video segment.

In an embodiment, the method further comprises receiving in the computerized playback device user decision commands from a plurality of communication terminals, and the computerized playback device determining from the user decision commands a popular user decision command. The playback device performs the following steps depending on the popular user decision command: retrieving and playing audio/video segments, selecting an audio track, selecting a cue point for changing an audio track, ending an audio track, stopping an audio/video segment at a defined time code of the audio/video segment being played, and/or starting a different audio/video segment at that time code.

In addition to the computerized device and method for playing an interactive audiovisual movie, the present invention also relates to a computer program product comprising a non-transient computer-readable medium having stored thereon a movie episode data object which comprises a plurality of audio/video segments, audio tracks which are separate from the audio/video segments and have no video content, and playback instructions. The playback instructions are configured to control a processor of a playback device to retrieve and play from the movie episode data object audio/video segments, to generate interface elements for receiving from a user decision commands while playing the audio/video segments, to retrieve and play from the movie episode data object further audio/video segments depending on the user decision commands, to retrieve from the movie episode data object one of the separate audio tracks, and to play the separate audio track uninterruptedly, during a change of audio/video segments occurring at a point in time selected interactively and dynamically by the user, while playing an end of a first audio/video segment, up to the point in time selected by the user, and a start of a second audio/video segment which is selected by the user and played subsequently to the first audio/video segment.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
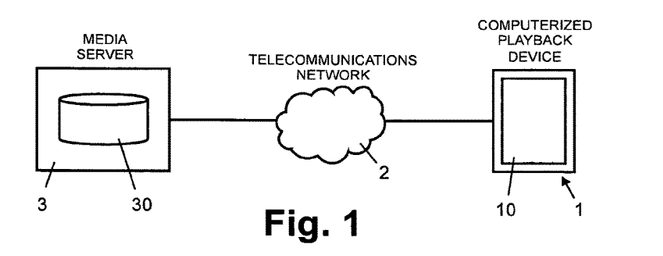
FIG. 1: shows a block diagram illustrating schematically a computerized playback device that is connected via a telecommunications network to a media server.
Figure 2:
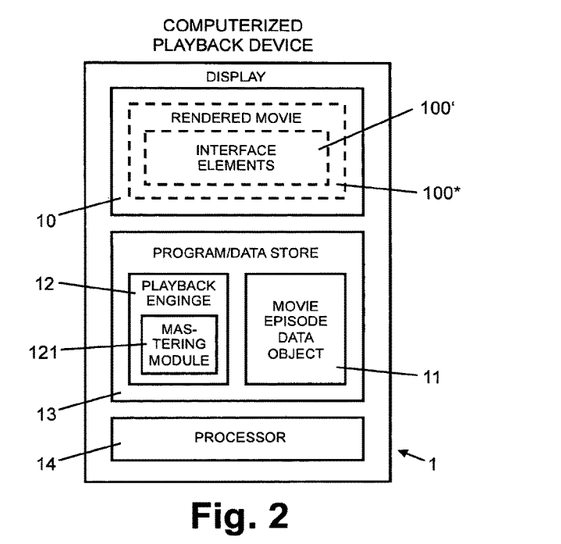
FIG. 2: shows a block diagram illustrating schematically a computerized playback device comprising a display, a processor, and a program/data store with a playback engine and a movie episode data object.
Figure 5:
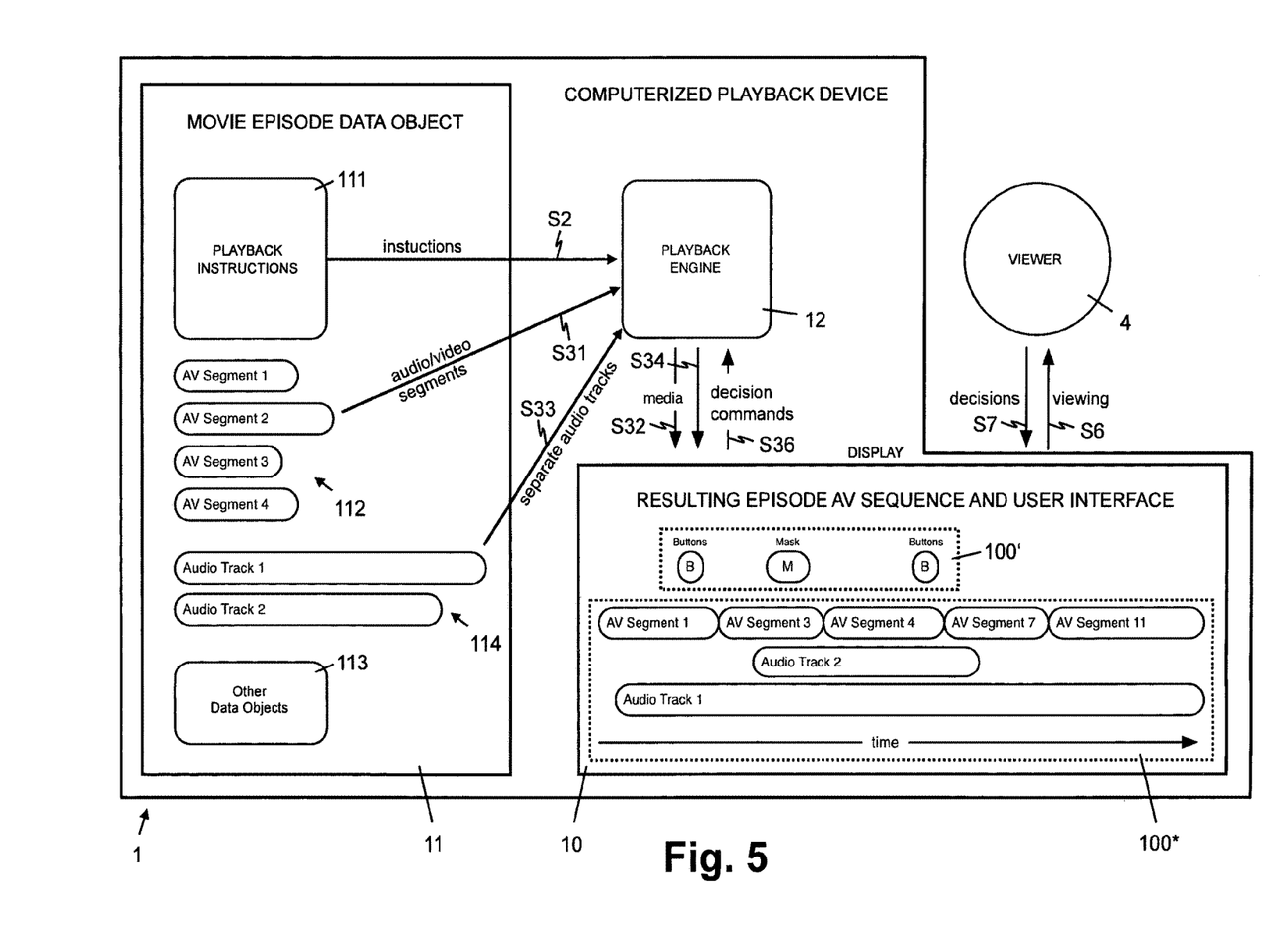
FIG. 5: shows a block diagram illustrating schematically a data flow in a computerized playback device for playing an interactive audiovisual movie.

In FIGS. 1, 2, 5 and 13, reference numeral 1 refers to a computerized device for playing an interactive audiovisual movie. As illustrated in FIGS. 1, 2, and 5, the computerized playback device 1 comprises a display 10 for showing to a viewer video segments of the audiovisual movie (rendered movie 100\*). Display 10 is configured as a touch sensitive display, for example but not necessarily a multi-touch display, enabling a user to enter commands by touching the display screen. In the embodiment shown in FIG. 13, the computerized playback system 1' or the computerized playback device 1, respectively, comprises a projection system 10*a* configured to show the video segments of the audiovisual movie to a plurality of viewers 4 through projection on a projection screen 10*b*, e.g. in a movie theatre. Although not illustrated, the computerized playback device 1 also comprises electro acoustic converters such as loudspeakers or headphones or at least a connection interface for connecting an electro acoustic converter to the playback device 1 for playing to a user audio segments of the audiovisual movie. As illustrated schematically in FIG. 2, the computerized playback device 1 further comprises a processor 14 and a program/data store 13 connected to the processor 14. The program/data store 13 has stored therein a playback engine 12 and is configured to store one or more movie episode data objects 11. The program/data store 13 comprises electronic data memory, including random access memory, flash memory, and/or dynamic random access memory, and the like. The playback engine 12 includes computer program code configured to control the processor 14 to execute various functions, as described later in more detail, for playing an interactive audiovisual movie. Depending on the embodiment, the computer program code of the playback engine 12 is stored on a non transient computer readable medium that is connected in a fixed or removable fashion to the processor 14. One skilled in the art will understand that in alternative embodiments, the playback engine 12 can be implemented fully or partly in hardware.

The computerized playback device 1 is implemented as a mobile radio telephone (a so called smart phone), a tablet computer, a notebook or laptop computer, or a another personal computer, e.g. a desktop computer with a display screen. In the embodiment shown in FIG. 13, the computerized playback device 1 is implemented as a computer system separate from or integrated with the projection system 10*b*.

In an embodiment, the playback engine 12 and at least one movie episode data object 11 are part of one common data file, e.g. an applet that is loadable into the playback device 1, e.g. via a telecommunications network 2 from a media server 3. On the media server 3, such applets and/or movie episode data objects 11 are stored in a data store 30 of interactive audiovisual movies. For example, the telecommunications network 2 includes the Internet as well as fixed communication networks and mobile radio communication networks for accessing the Internet, such as cellular telephone networks, e.g. GSM (Global System for Mobile Communication) or UMTS (Universal Mobile Telephone System, or other radio based networks, e.g. WLANs (Wireless Local Area Network).

Figure 3:
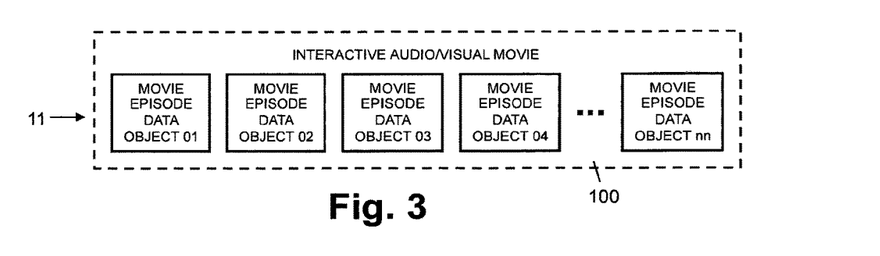
FIG. 3: shows a block diagram illustrating schematically an exemplary sequence of movie episode data objects of an interactive audiovisual movie.

As shown schematically in FIG. 5, a movie episode data object 11 includes playback instructions 111, audio/video segments 112, separate audio tracks 114 which have no video content and are separate from the audio/video segments 112, and other data objects 113. The audio/video segments 112 as well as the separate audio tracks 114 may have different and variable lengths, i.e. different number of frames and/or duration, respectively. A movie episode data object 11 includes all data required for one episode of an interactive audio/visual movie; specifically, all audio/video segments 112 and separate audio tracks 114 for the various possible sequences that can be defined interactively by the viewer through user decision commands. Depending on its embodiment, configuration and/or length, an interactive audio/visual movie 111 has several episodes and includes several movie episode data objects 11 to be processed in a defined sequence, as illustrated in FIG. 3, or an interactive audio/visual movie 100 has just one episode with one episode data object 11 which comprises all the data of the entire interactive audio/visual movie 100. As will be described later in more detail, the playback instructions 111 are configured to direct the playback engine 12 to play an interactive audiovisual movie. Specifically, the playback instructions 111 are configured to direct the playback engine 12 to retrieve and play from the movie episode data object 11 audio/video segments 112 and separate audio tracks 114, to receive from a user decision commands while playing the audio/video segments 112 and separate audio tracks 114, and to retrieve and play from the movie episode data object 11 further audio/video segments 112 and separate audio tracks 114 depending on the user decision commands. For example, the playback instructions 111 are implemented in a markup language such as HTML (Hypertext Markup Language). One skilled in the art will understand that in alternative embodiments, the playback instructions 111 can be implemented in another language, for example in Java which is run or interpreted on a Java Virtual Machine of the playback engine 12 (Java is registered trademark of Sun Microsystems, Inc.).

Figure 4:
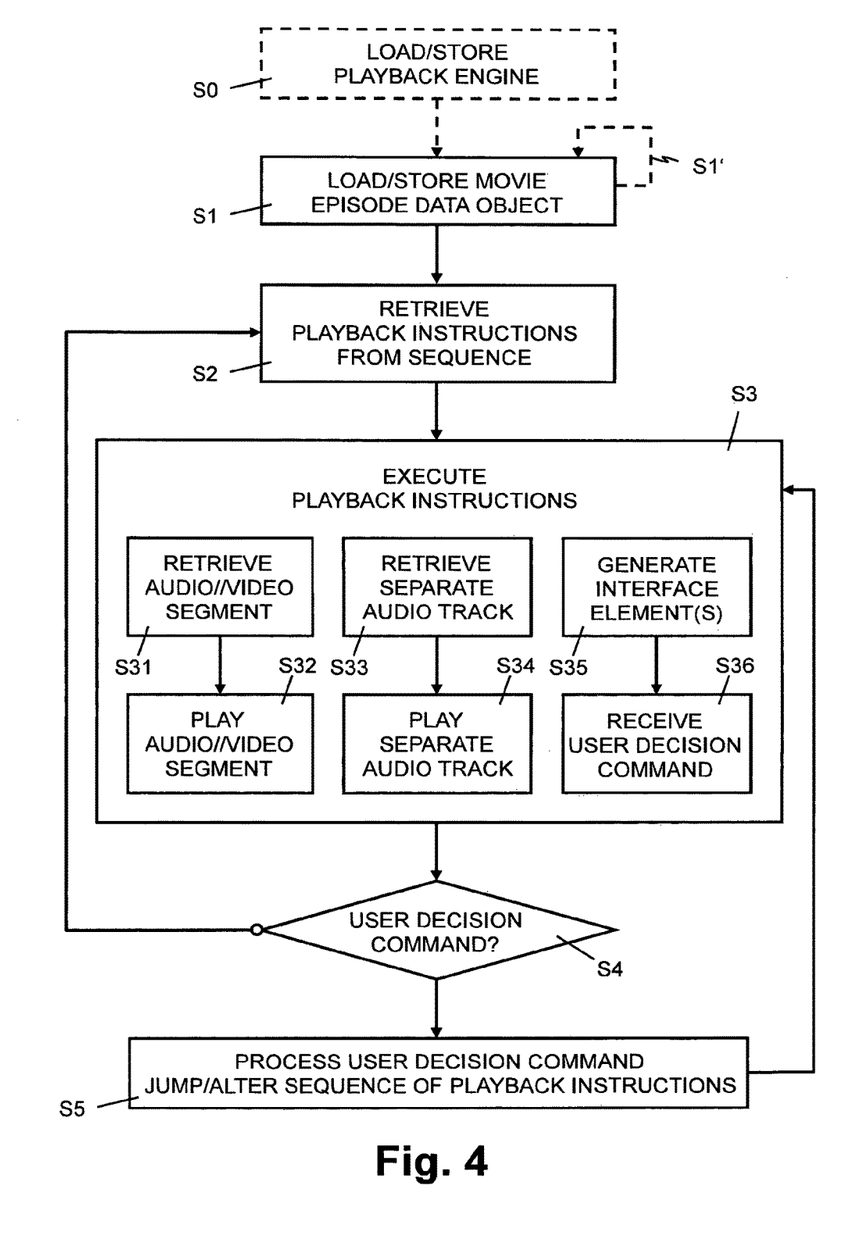
FIG. 4: shows a flow diagram illustrating an exemplary sequence of steps for playing an interactive audiovisual movie.

In the following paragraphs, described with reference to FIG. 4 are possible sequences of steps performed by the playback engine 12 for playing an interactive audiovisual movie 100.

In optional preparatory step S0, the playback engine 12 is loaded and stored in the computerized playback device 1. For example, the playback engine 12 is loaded as an applet from an app or application server or from a media server 3 via the telecommunications network 2.

In preparatory step S1, a movie episode data object 11 of a selected interactive audio/visual movie 100 is loaded and stored in the computerized playback device 1. For example, the movie episode data object 11 is loaded from a media server 3 via the telecommunications network 2. In an embodiment, steps S0 and S1 are combined in that the playback engine 12 and at least one movie episode data object 11 are loaded and stored in one combined data object, e.g. in form of an applet, as mentioned above.

As indicated schematically in FIG. 4, in step S1', further movie episode data objects 11 for subsequent episodes of the selected interactive audio/visual movie 100 are loaded and stored in the computerized playback device 1. In an embodiment, the further movie episode data objects 11 are loaded while the previously loaded movie episode data object 11 is being processed by the playback engine 12, until the movie episode data objects 11 for all the episodes of the selected interactive audio/visual movie 100 have been loaded. Processing of a movie episode data object 11 only starts when the respective movie episode data object 11 is fully and completely loaded and stored in the computerized playback device 1. Downloading the movie episode data objects 11 is controlled by the playback engine 12 so that the selected interactive audio/visual movie 100 can be played without interruptions or delays. Thus, depending on the available bandwidth of telecommunications network 2, more than one movie episode data object 11 may be loaded and stored, before playing of the interactive audio/visual movie 100 begins by processing its first movie episode data object 11.

In step S2, the playback engine 12 retrieves the playback instructions 111 from the (current) movie episode data object 11. The playback instructions 111 are retrieved one by one, following the sequential order in which they are stored in the movie episode data object 11, unless there are conditions and/or events that change the order or way in which the playback instructions 111 are processed, i.e. conditions and/or events that cause jumps or alterations in the sequence of playback instructions 111.

In step S3, the playback engine 12 processes the retrieved playback instructions 111. As illustrated schematically in FIG. 4, depending on the playback instructions 111, the playback engine 12 executes different steps S31, S32, S33, S34, S35, S36 some of which may be performed concurrently.

In step S31, the playback engine 12 retrieves from the (current) movie episode data object 11 the audio/video segment 112 specified by the playback instruction 111.

In step S32, the playback engine 12 plays the retrieved audio/video segment 112. Specifically, the playback engine 12 shows the sequence of frames of the audio/video segment 112 on the display 10 and plays the synchronized audio track of the audio/video segment 112 via an electro acoustic converter.

In step S33, the playback engine 12 retrieves from the (current) movie episode data object 11 the separate audio track(s) 114 specified by the playback instruction 111.

In step S34, the playback engine 12 plays the separate audio track(s) 114. The timing and/or synchronization of the separate audio track(s) 114 with the rendering of the audio/video segments 112 depends on the playback instructions 111 and/or user decision commands, as will be explained later in more detail.

In step S35, the playback engine 12 generates interface elements 100' (see FIG. 5) defined by the playback instruction 111. The interface elements are rendered on the display 10 as an overlay (or underlay) to the movie. The playback engine 12 generates different types of interface elements 100', including visible interface elements, such as buttons B or other graphical user interface elements, and non-visible interface elements which function as masks M that define specific "active" regions of the display 10 or the rendered movie 100* on the display 10, respectively. At least some of the interface elements are stored as other data objects 113 in the movie episode data object 11. The non-visible interface elements enable the user to select specific objects and/or people in the rendered movie by touching or tapping on them and thereby touching the underlying (or overlying) active area. The masks M or active regions defined by the non-visible interface elements are animated, e.g. they change dynamically, e.g. at a rate of 5 times per second, while the movie is being played and follow the movement of respective objects or persons such that they remain active for the viewer even when their relative position in the display 10 changes. For example, the non-visible interface elements or masks M, respectively, are implemented as sequences of low resolution bitmap images (e.g. PNG, Portable Network Graphics with 240×96 pixels). The bitmap images are black and have coloured areas that define one or more active areas. The bitmap images cover the full movie display window in the display 10. When a coloured area is touched by the viewer, the colour value is returned to the playback engine 12, while touching a black area causes no action.

Figure 13:
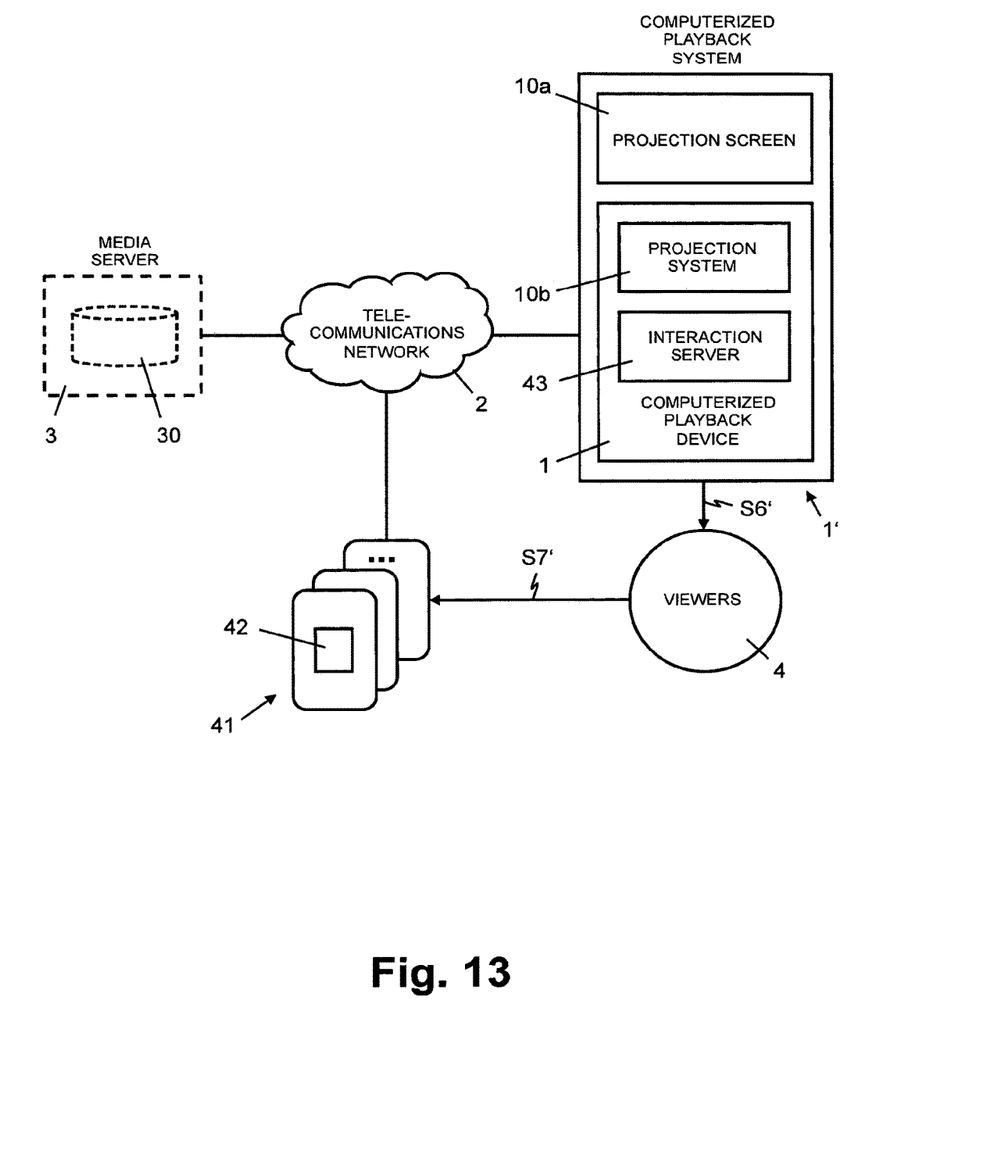
FIG. 13: shows a block diagram illustrating schematically a computerized playback system that is connected via a telecommunications network to communication terminals.

In the embodiment shown in FIG. 13, the visible interface elements are generated and shown by playback engine 12 on the projection screen 10a; however, viewer/user interaction is made possible via communication terminals 41, e.g. mobile communication devices such as mobile phones, tablet computers, or other mobile data communication devices configured to communicate via telecommunications network 2 with the computerized playback device 1 or a computerized interaction server 43. Alternatively, the communication terminals 41 are installed in a fixed fashion, e.g. with at least some of the seats in the movie theatre, and connected via a wired or wireless communication network to the computerized playback system 1' or the computerized playback device 1, respectively. The interaction server 43 is implemented as a computer system separate from or integrated into the computerized playback device 1. In an embodiment, the interaction server 43 is part of or integrated with the playback engine 12. The interaction server 43 is accessible to the communication terminals 41 via the telecommunications network 2 or another telecommunication network, e.g. a LAN or a WLAN. The interaction server 43 is configured to provide to the communication terminals 41 an interaction module 42, e.g. a programmed software module (applet) that is downloaded and run on the communication terminals 41, or that is implemented and running on a computer of the interaction server 43, e.g. as a web site or web server. The interaction server 43 is further configured to generate and show on the displays of the communication terminals 41 interface elements, synchronized with the interface elements generated and shown by the playback engine 12 on the projection screen 10a. In an embodiment, the interface elements are generated and shown by the interaction module 42. As is indicated schematically in FIG. 13, the external media server 3 is optional. In an embodiment, the media server and the data store with at least one interactive audiovisual movie are part of the computerized playback system 1' or its computerized playback device 1, respectively. Alternatively, the computerized playback device 1 is configured to retrieve the movie episode data objects, e.g. for a complete interactive audiovisual movie, from the external media server 3 and stores them locally in a data store of the computerized playback device 1.

In step S36, the playback engine 12 receives user decision commands which are entered by the user via the interface elements 100' rendered on the touch sensitive display 10. Touching or clicking a button or an active area is associated with a specific user decision command and/or triggers a defined action assigned to the respective interface element 100'. For example, a button may trigger an action that is indicated as text or a symbol, such as "say yes" or "say no", while an active area may trigger an action that is associated with the respective object or person, such as pick up and use the specific object for its intended purpose, e.g. pick up and shoot a gun, e.g. depending on the returned colour value.

In the embodiment shown in FIG. 13, as is indicated with reference numeral S6', the viewer watches the interactive audio/visual movie shown on the projection screen 10a. As indicated with reference numeral S7', responsive to the interface elements generated and shown in synchronized fashion on the projection screen 10a and on the displays of the communication terminals 41, the viewers 4 enter and transfer to the computerized playback device 1 or the interaction server 43, respectively, user decision commands using their communication terminals 41. The viewers enter their decision commands through the interaction module 42. For example, the viewers enter their decision commands via touch sensitive displays of their communication terminals 41, as described above with reference to step S36.

In step S4, the playback engine 12 determines whether or not a user decision command was received. If no decision command was received, the playback engine 12 continues processing the playback instructions 111 in the sequence defined in the movie episode data object 11. Otherwise, the playback engine 12 processes the user decision command in step S5.

In the embodiment shown in FIG. 13, the interaction server 43 stores and processes the user decision commands received from a plurality of the viewers 4. The interaction server 43 is configured to determine from the received user decision commands a popular decision command related to a respective interface element. Depending on the embodiment and/or configuration, the popular decision command is determined based on the majority of received decision commands, taking into consideration the total number of present viewers and/or weighting factors associated with different viewers or their respective tickets or user rights, for example.

In step S5, the playback engine 12 processes the playback instructions 111 depending on the user decision command or popular decision command, respectively. Specifically, the playback engine 12 jumps or alters the sequence of playback instructions 111. More specifically, in response to and depending on the (popular) user decision commands, the playback engine 12 follows different sequences of the playback instructions 111 which results in retrieving and playing different audio/video segments 112 and/or separate audio tracks 114 and ultimately changing the course of the interactive audio/visual movie 100.

FIG. 5 illustrates schematically the interaction of a user or viewer 4 with the computerized playback device 1 and its touch sensitive display 10, or with the rendered interactive audio/visual movie 100*, respectively. Specifically, in FIG. 5, reference numeral S6 refers to the viewer's activity of viewing the interactive audio/visual movie 100* played on the display, while reference numeral S7 refers to the viewer's activity of making decisions by activating/touching interface elements 100' rendered with the interactive audio/visual movie 100* shown on the display 10.

Figure 6:
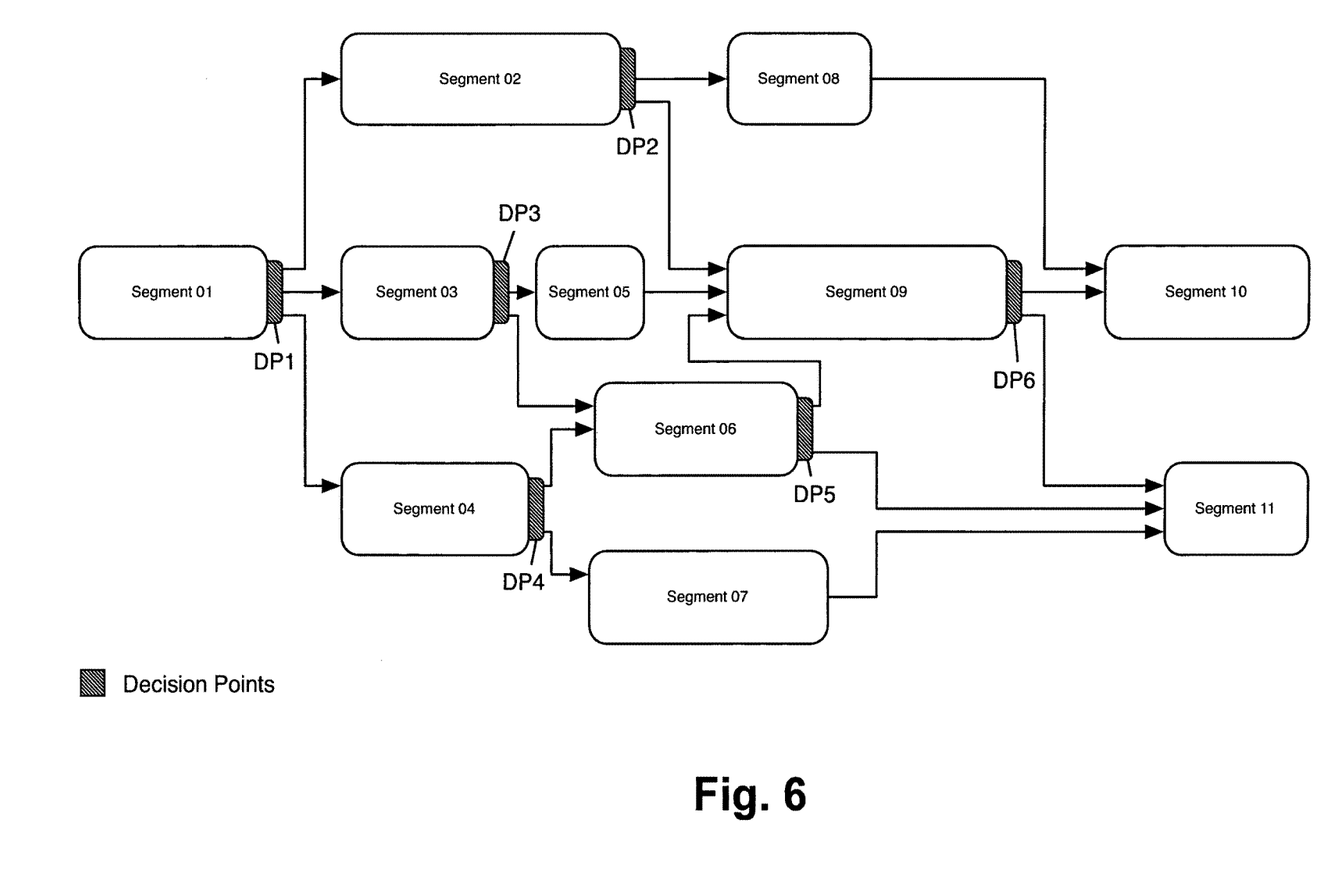
FIG. 6: shows a flow diagram illustrating an example of different possible sequences of audio/video segments.

FIG. 6 shows an example of different possible sequences of audio/video segments Segment01-Segment11. The sequences are defined by the playback instructions 111 which define decision points DP1, DP2, DP3, DP4, DP5, DP6 where, depending on received user decision commands, a different sequence is defined and, thus, different audio/video segments 112 (and/or separate audio tracks 114) are retrieved and played. For example, depending on a user decision command received during the playing of Segment01, at the decision point DP1, the playback engine 12 continues the sequence by retrieving and playing either one of Segment02, Segment03, or Segment04. FIG. 6 further illustrates, that different sequences or paths may join up again, e.g. by retrieving and playing Segment06, Segment09, Segment10, or Segment11, depending on user decision commands received or processed at decision points DP2, DP4, DP5, or DP6, respectively. It should be noted that the length (duration, frame number) of the selected audio/video segments 112 (or separate audio tracks 114) may be different and vary. Moreover, depending on the user decision commands an episode or sequence may have different endings, i.e. at the end of the sequence, episode or interactive audio/visual movie, a different audio/video segment 112 may be retrieved and played by the playback engine 12.

Figure 7:
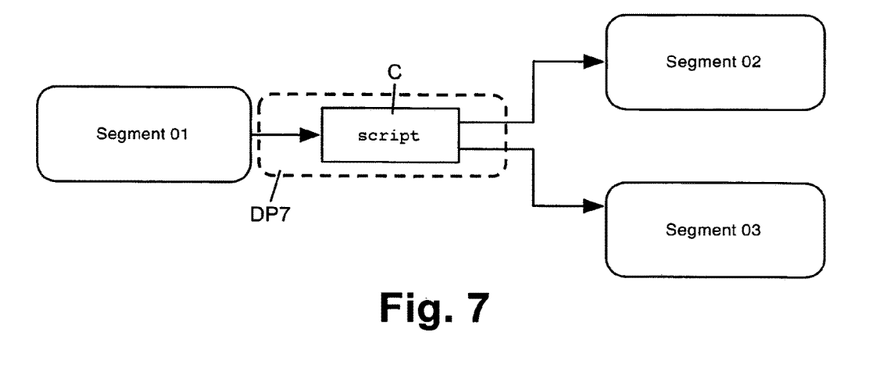
FIG. 7: shows a flow diagram illustrating a decision point between two different sequences where the decision is made by running a script.

FIG. 7 shows an example of different possible sequences of audio/video segments (Segment01-Segment02 or Segment 01-Segment 03) where the playback instructions 111 define a decision point DP6 where different sequences are defined by a script C. Script C comprises one or more logic expressions, e.g. written in a program language such as Java (Java is registered trademark of Sun Microsystems, Inc.). Depending on one or more variables, including performed actions and user decision commands, the script C determines the audio/video segment Segment02 or Segment03 (or separate audio tracks 114) that is retrieved and played by the playback engine 12 subsequent to the preceding audio/video segment Segment01. In an embodiment, the script C is based on a randomized variable, e.g. output by a random generator.

Figure 8:
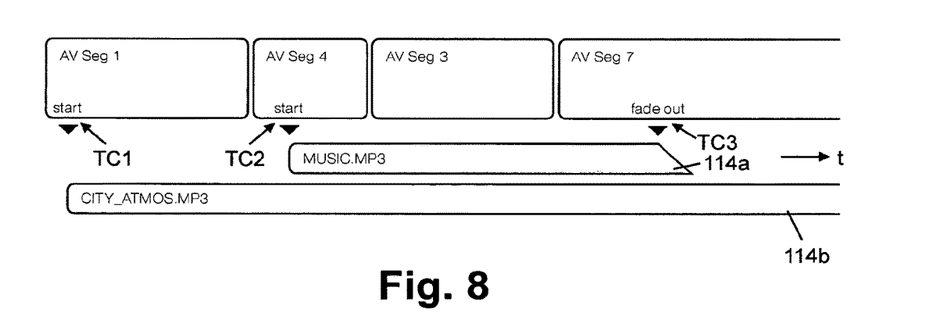
FIG. 8 shows a time diagram illustrating an example of a sequence of audio/video segments and separate audio tracks which are played concurrently with the sequence, across the boundary of at least two consecutive audio/video segments.

FIG. 8 shows an example of separate audio tracks 114a, 114b that are played by the playback engine 12 while a sequence of audio/video segments AVSeg1, AVSeg4, AVSeg3, AVSeg7 of the interactive audio/visual movie is being played. As is illustrated in FIG. 8, the separate audio tracks 114a, 114b are being played by the playback engine 12 while a sequence of audio/video segments AVSeg1, AVSeg4, AVSeg3, AVSeg7 of the interactive audio/visual movie is being played. As can be seen in FIG. 8, the separate audio tracks 114a, 114b are being played by the playback engine 12 across more than one audio/video segments AVSeg1, AVSeg4, AVSeg3, AVSeg7; particularly, separate audio tracks 114a, 114b are being played by the playback engine 12 across the changeover of two consecutive audio/video segments AVSeg1, AVSeg4, AVSeg3, AVSeg7. Thus, the playback instructions direct the playback engine 12 to play the separate audio tracks 114a, 114b uninterruptedly across the boundary of two consecutive audio/vide segments (e.g. audio/video segment AVSeg3 and AVSeg7), i.e. during the transition of a preceding first audio/video segment (e.g. audio/video segment AVSeg3) to a subsequent second audio/video segment (e.g. audio/video segment AVSeg7), or in other words while playing the end of the preceding first audio/video segment (e.g. audio/video segment AVSeg3)

and the start of the subsequent second audio/video segment (e.g. audio/video segment AVSeg7).

The selection, retrieval, and playing of a specific separate audio track 114 is defined by the playback instructions 111. Depending on the scenario, the actual start or activation of the retrieval and playing is further defined by user decision commands and/or the specific audio/video segments 112 selected for playing. In the example of FIG. 8, the playback instructions 111 direct the playback engine 12 to retrieve and play the separate audio track 114a at a specific time code TC2 during playback of a specific audio/video segment AVSeg4, and to play the separate audio track 114b at a specific time code TC1 during playback of a specific audio/video segment AVSeg1.

Playing of a separate audio track 114 ends with the end of the respective separate audio track 114 or as defined by alternative playback instructions 111. In the example of FIG. 8, the playback instructions 111 direct the playback engine 12 to end the playback of the separate audio track 114a at a specific time code TC3 of a specific audio/video segment AVSeg7 by commencing at this time code TC3 a fade out of the separate audio track 114a.

In addition to stopping the separate audio track 114 at a defined time code of the audio/video segment 112 being played, there are other playback instructions 111 that direct the playback engine 12 to stop the separate audio track 114 at a beat of the separate audio track 114, to stop the separate audio track 114 at once, to fade out the separate audio track 114 by starting fade out at a defined time code of the audio/video segment being played, and/or to fade out the separate audio track 114 by starting fade out at once.

Furthermore, there are other playback instructions 111 that direct the playback engine 12 to cross fade the separate audio track 114 with a different separate audio track 114 and/or to replace the separate audio track 114 with a suitable audio end track, as will be described in the following paragraphs with reference to FIG. 9.

Figure 9:
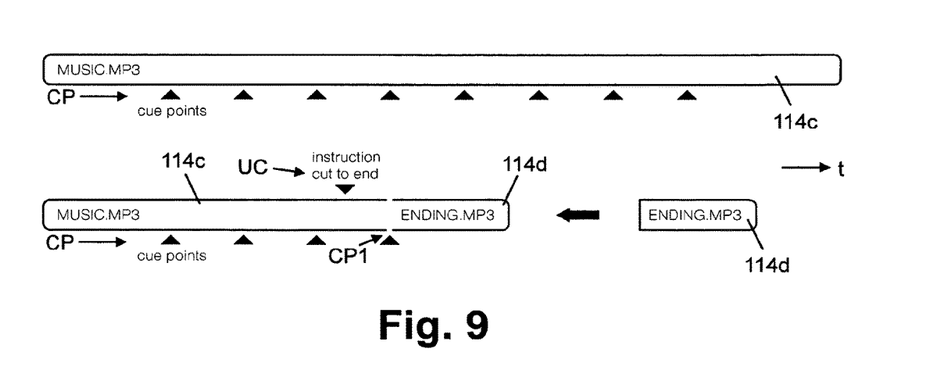
FIG. 9: shows an example of a separate audio track with cue points and an audio end track inserted at a cue point of the separate audio track.

In the example of FIG. 9, the separate audio track 114c includes cue points CP which indicate in each case a position in the separate audio track 114c that is suitable for editing during playing of the separate audio track 114c. The cue points are stored as part of the separate audio track 114c or in a separate cue point table, for example. The suitability of an audio track for editing depends primarily on rhythm and dynamics of the audio track. In essence, suitability for editing makes it possible to replace a first separate audio track 114 with a second separate audio track 114 during playback of the audio tracks, without causing an audible disruption in the resulting audio playback that would be perceived as a non-seamless, disturbing transition. FIG. 9 illustrates an audio end track 114d which is a separate audio track 114 that is suitable to be inserted at any cue point CP of the separate audio track 114c as an ending of the separate audio track 114c. As illustrated in FIG. 9, the actual cue point CP1, where the audio end track 114d is inserted as an ending to the separate audio track 114c, is determined based on an instruction UC, e.g. as a consequence of a user decision command, to end the separate audio track 114c. Responsive to this end instruction, the playback engine 12 processes the respective playback instructions 111 that direct the playback engine 12 to end the separate audio track 114c by selecting the next suitable cue point CP1 after the reception of the end instruction, and by inserting the audio end track 114d at that cue point CP1. Not only the point in time when a separate audio track 114c is ended is determined as a consequence of a user decision command, but also the actual the audio end track 114d may be selected depending on the user decision command. For example, if the user enters a user decision command that causes the interactive audio/visual movie 100 to follow a first story line that is calm, the audio end track 114d associated with the audio/video segments 112 of the first story line will be more quiet than the end track 114d associated with the audio/video segments 112 of an alternative second story that is full of action and suspense. In an embodiment, the selection of the separate audio tracks 114 is made by running a script C, as described above with reference to FIG. 7 for the selection of audio/video segments.

As illustrated in FIG. 2, the playback engine 12 comprises a mastering module 121 configured to generate an audio master track by mixing and mastering the audio part, i.e. the synchronized audio track, of the audio/video segment 112 and one or more separate audio tracks 114 that are played concurrently with the audio/video segment 112. For example, priority is given to the synchronized audio track of the audio/video segment 112 while the volume of the separate audio tracks is reduced, and the resulting audio stream is limited, e.g. to −0.1 dB.

Figure 10:
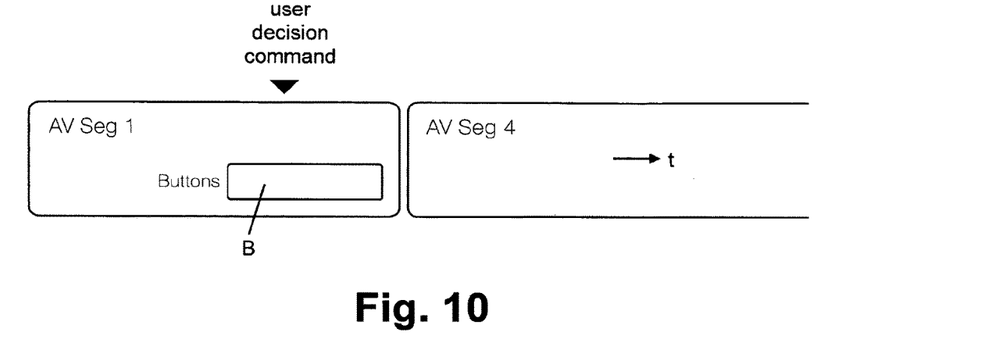
FIG. 10: shows an example of an audio/video segment with an interface element for entering user decision commands where, upon entry of a decision command, playing of a user selected audio video segment starts at the end of the preceding audio video segment.
Figure 11:
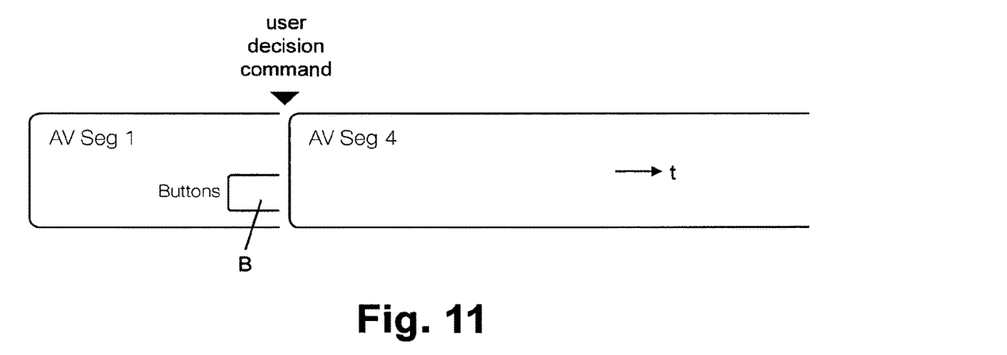
FIG. 11: shows an example of the audio/video segment with the interface element where playing of the user selected audio video segment starts at the activation of the interface element.
Figure 12:
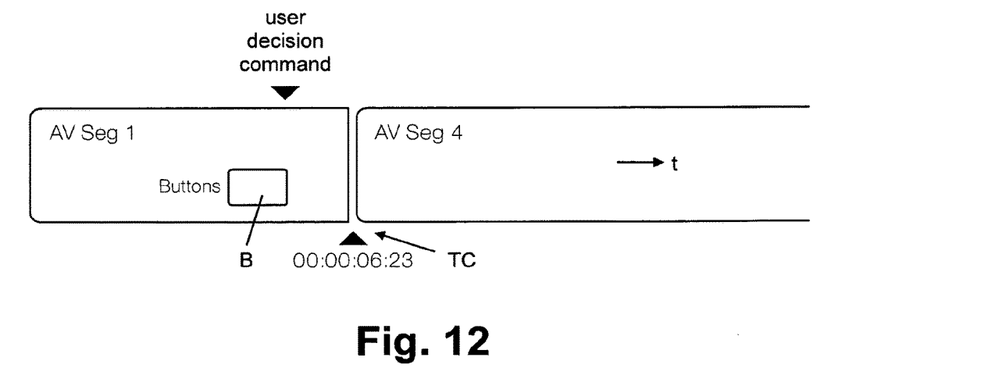
FIG. 12: shows an example of the audio/video segment with the interface element where playing of the user selected audio video segment starts at a defined time code after the activation of the interface element.

FIGS. 10-12 illustrate the timing of the changeover from a preceding first audio/video segment AVSeg1 to a subsequent second audio/video segment AVSeg4 in response to a user decision command entered via an interface element 100', e.g. by touching, tapping, or clicking a button B.

In the example shown in FIG. 10, as directed by the respective playback instructions 111, the playback engine 12 starts playing the subsequent audio/video segment AVSeg4 selected by the user decision command at the end of the preceding audio/video segment AVSeg4, in a seamless, uninterrupted fashion.

In the example shown in FIG. 11, as directed by the respective playback instructions 111, the playback engine 12 starts playing the subsequent audio/video segment AVSeg4 selected by the user decision command in immediate response to the user command decision, e.g. at the touch, tap, or click of a button B, thereby interrupting the preceding audio/video segment AVSeg1.

In the example shown in FIG. 12, as directed by the respective playback instructions 111, the playback engine 12 starts playing the subsequent audio/video segment AVSeg4 selected by the user decision command at a defined time code TC after the point in time of receiving the user command decision, e.g. after the touch, tap, or click of a button B, thereby interrupting the preceding audio/video segment AVSeg1 at a defined time code TC.

In all the examples illustrated in FIGS. 10, 11, and 12, one or more separate audio tracks 114, 114a, 114b, 114c, 114d are being played uninterruptedly across the boundary or transition from the first audio/video segment AVSeg1 to the user selected subsequent second audio/video segment AVSeg4. In other words, the user selected and timed change from the first audio/video segment AVSeg1 to the user selected subsequent second audio/video segment AVSeg4 takes place while one or more separate audio tracks 114, 114a, 114b, 114c, 114d are being played uninterruptedly.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A computerized device for playing an interactive audiovisual movie, the computerized device comprising:
a hardware processor configured to execute computer program code to implement at least:
a playback engine; and
a movie episode data object which comprises a plurality of audio/video segments and playback instructions configured to direct the playback engine to retrieve and play from the movie episode data object audio/video segments, to receive from a user decision commands while playing the audio/video segments, and to retrieve and play from the movie episode data object further audio/video segments depending on the user decision commands;
wherein the movie episode data object further comprises audio tracks which are separate from the audio/video segments and have no video content, and further playback instructions configured to direct the playback engine to retrieve from the movie episode data object one of the separate audio tracks and to play the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and
wherein the separate audio tracks include cue points, a cue point indicating a position in an audio track where, during playing of that audio track, the audio track is suitable for editing; and the movie episode data object further comprises playback instructions configured to direct the playback engine to stop playing a separate audio track at a cue point and to start playing a different separate audio track at that cue point.

2. The device of claim 1, wherein the movie episode data object further comprises playback instructions configured to direct the playback engine to select a cue point for changing the audio track depending on the user decision commands.

3. The device of claim 1, wherein the movie episode data object further comprises playback instructions configured to direct the playback engine to select the different audio track depending on the user decision commands.

4. A computerized device for playing an interactive audiovisual movie, the computerized device comprising:
a hardware processor configured to execute computer program code to implement at least:
a playback engine; and
a movie episode data object which comprises a plurality of audio/video segments and playback instructions configured to direct the playback engine to retrieve and play from the movie episode data object audio/video segments, to receive from a user decision commands while playing the audio/video segments, and to retrieve and play from the movie episode data object further audio/video segments depending on the user decision commands;
wherein the movie episode data object further comprises audio tracks which are separate from the audio/video segments and have no video content, and further playback instructions configured to direct the playback engine to retrieve from the movie episode data object one of the separate audio tracks and to play the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and
wherein the movie episode data object further comprises playback instructions configured to direct the playback engine, depending on the user decision commands, to end playing a separate audio track by performing one of: stopping the audio track at a defined time code of the audio/video segment being played, stopping the audio track at a beat of the audio track, stopping the audio track at once, fading out the audio track by starting fade out at a defined time code of the audio/video segment being played, fading out the audio track by starting fade out at once, replacing the audio track with a suitable audio end track, and cross fading the audio track with a different audio track.

5. A computerized device for playing an interactive audiovisual movie, the computerized device comprising:
a hardware processor configured to execute computer program code to implement at least:
a playback engine; and
a movie episode data object which comprises a plurality of audio/video segments and playback instructions configured to direct the playback engine to retrieve and play from the movie episode data object audio/video segments, to receive from a user decision commands while playing the audio/video segments, and to retrieve and play from the movie episode data object further audio/video segments depending on the user decision commands;
wherein the movie episode data object further comprises audio tracks which are separate from the audio/video segments and have no video content, and further playback instructions configured to direct the playback engine to retrieve from the movie episode data object one of the separate audio tracks and to play the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and
wherein the movie episode data object further comprises playback instructions configured to direct the playback engine, depending on the user decision commands, to stop playing an audio/video segment at a defined time code of the audio/video segment being played, and to start playing a different audio/video segment at that time code.

6. A computerized device for playing an interactive audiovisual movie, the computerized device comprising:
a hardware processor configured to execute computer program code to implement at least:
a playback engine; and
a movie episode data object which comprises a plurality of audio/video segments and playback instructions configured to direct the playback engine to retrieve and play from the movie episode data object audio/video segments, to receive from a user decision commands while playing the audio/video segments, and to retrieve and play from the movie episode data object further audio/video segments depending on the user decision commands;

wherein the movie episode data object further comprises audio tracks which are separate from the audio/video segments and have no video content, and further playback instructions configured to direct the playback engine to retrieve from the movie episode data object one of the separate audio tracks and to play the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and wherein the playback engine is configured to generate an audio master track by mixing and mastering the audio/video segment and one or more separate audio tracks that are played concurrently with the audio/video segment.

7. A computerized device for playing an interactive audiovisual movie, the computerized device comprising:
a hardware processor configured to execute computer program code to implement at least:
a playback engine; and
a movie episode data object which comprises a plurality of audio/video segments and playback instructions configured to direct the playback engine to retrieve and play from the movie episode data object audio/video segments, to receive from a user decision commands while playing the audio/video segments, and to retrieve and play from the movie episode data object further audio/video segments depending on the user decision commands;

wherein the movie episode data object further comprises audio tracks which are separate from the audio/video segments and have no video content, and further playback instructions configured to direct the playback engine to retrieve from the movie episode data object one of the separate audio tracks and to play the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and an interaction server configured to receive user decision commands from a plurality of communication terminals, to determine from the user decision commands a popular user decision command, and perform at least one of the following steps depending on the popular user decision command:
retrieving and playing audio/video segments,
selecting an audio track, selecting a cue point for changing an audio track,
ending an audio track,
stopping an audio/video segment at a defined time code of the audio/video segment being played, or
starting a different audio/video segment at that time code.

8. A method of playing an interactive audiovisual movie, the method comprising:
storing in a data store of a computerized playback device a movie episode data object which comprises a plurality of audio/video segments, audio tracks which are separate from the audio/video segments and have no video content, and playback instructions;
retrieving by the playback device the playback instructions from the movie episode data object, and in accordance with the playback instructions the playback device performing the steps of:
retrieving and playing from the movie episode data object audio/video segments,
generating interface elements for receiving from a user decision commands while playing the audio/video segments,
retrieving and playing from the movie episode data object further audio/video segments depending on the user decision commands,
retrieving from the movie episode data object one of the separate audio tracks, and
playing the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and
wherein the movie episode data object is stored in the data store with separate audio tracks which include cue points, a cue point indicating a position in an audio track where, during playing of that audio track, the audio track is suitable for editing; and the method further comprises the playback device, in accordance with the playback instructions, stopping to play a separate audio track at a cue point and starting to play a different separate audio track at that cue point.

9. The method of claim 8, wherein the method further comprises the playback device, in accordance with the playback instructions, selecting a cue point for changing the audio track depending on the user decision commands.

10. The method of claim 8, wherein the method further comprises the playback device, in accordance with the playback instructions, selecting the different audio track depending on the user decision commands.

11. A method of playing an interactive audiovisual movie, the method comprising:
storing in a data store of a computerized playback device a movie episode data object which comprises a plurality of audio/video segments, audio tracks which are separate from the audio/video segments and have no video content, and playback instructions;
retrieving by the playback device the playback instructions from the movie episode data object, and in accordance with the playback instructions the playback device performing the steps of:
retrieving and playing from the movie episode data object audio/video segments,
generating interface elements for receiving from a user decision commands while playing the audio/video segments,
retrieving and playing from the movie episode data object further audio/video segments depending on the user decision commands,
retrieving from the movie episode data object one of the separate audio tracks,
playing the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and in accordance with the playback instructions and depending on the user decision commands, ending to play a separate audio track by performing one of:

stopping the audio track at a defined time code of the audio/video segment being played, stopping the audio track at a beat of the audio track, stopping the audio track at once, fading out the audio track by starting fade out at a defined time code of the audio/video segment being played, fading out the audio track by starting fade out at once, replacing the audio track with a suitable audio end track, or cross fading the audio track with a different audio track.

12. A method of playing an interactive audiovisual movie, the method comprising:

storing in a data store of a computerized playback device a movie episode data object which comprises a plurality of audio/video segments, audio tracks which are separate from the audio/video segments and have no video content, and playback instructions;

retrieving by the playback device the playback instructions from the movie episode data object, and in accordance with the playback instructions the playback device performing the steps of:

retrieving and playing from the movie episode data object audio/video segments, generating interface elements for receiving from a user decision commands while playing the audio/video segments, retrieving and playing from the movie episode data object further audio/video segments depending on the user decision commands, retrieving from the movie episode data object one of the separate audio tracks, playing the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and in accordance with the playback instructions and depending on the user decision commands, stopping to play the audio/video segment at a defined time code of the audio/video segment being played, and starting to play a different audio/video segment at that time code.

13. A method of playing an interactive audiovisual movie, the method comprising:

storing in a data store of a computerized playback device a movie episode data object which comprises a plurality of audio/video segments, audio tracks which are separate from the audio/video segments and have no video content, and playback instructions;

retrieving by the playback device the playback instructions from the movie episode data object, and in accordance with the playback instructions the playback device performing the steps of:

retrieving and playing from the movie episode data object audio/video segments, generating interface elements for receiving from a user decision commands while playing the audio/video segments, retrieving and playing from the movie episode data object further audio/video segments depending on the user decision commands, retrieving from the movie episode data object one of the separate audio tracks, playing the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and generating an audio master track by mixing and mastering the audio/video segment and one or more separate audio tracks that are played concurrently with the audio/video segment.

14. A method of playing an interactive audiovisual movie, the method comprising:

storing in a data store of a computerized playback device a movie episode data object which comprises a plurality of audio/video segments, audio tracks which are separate from the audio/video segments and have no video content, and playback instructions;

retrieving by the playback device the playback instructions from the movie episode data object, and in accordance with the playback instructions the playback device performing the steps of:

retrieving and playing from the movie episode data object audio/video segments, generating interface elements for receiving from a user decision commands while playing the audio/video segments, retrieving and playing from the movie episode data object further audio/video segments depending on the user decision commands, retrieving from the movie episode data object one of the separate audio tracks, playing the separate audio track uninterruptedly, during a change of audio/video segments at a point in time selected interactively and dynamically by the user, while playing an end of a first audio/video segment, up to the point in time selected by the user, and a start of a second audio/video segment which is selected by the user and played subsequently to the first audio/video segment; and receiving in the computerized playback device user decision commands from a plurality of communication terminals;

the computerized playback device determining from the user decision commands a popular user decision command; and the playback device performing at least one of the following steps depending on the popular user decision command:

retrieving and playing audio/video segments, selecting an audio track, selecting a cue point for changing an audio track,
ending an audio track,
stopping an audio/video segment at a defined time code of the audio/video segment being played, or
starting a different audio/video segment at that time code.

\* \* \* \* \*